United States Patent [19]
Barnett et al.

[11] Patent Number: 6,095,032
[45] Date of Patent: Aug. 1, 2000

[54] COFFEE GRINDING, PORTIONING, AND PRESSING DEVICE

[75] Inventors: Mark L. Barnett; John W. Blackwell, both of Seattle, Wash.

[73] Assignee: La Marzocco International L.L.C., Seattle, Wash.

[21] Appl. No.: 09/187,831

[22] Filed: Nov. 6, 1998

[51] Int. Cl.[7] ....................................................... A47J 42/00
[52] U.S. Cl. .............................. 99/286; 99/287; 100/96; 100/145; 241/101.2
[58] Field of Search .......................... 99/286, 287; 100/96, 100/125, 145; 241/101.2

[56] References Cited

U.S. PATENT DOCUMENTS

| | | | |
|---|---|---|---|
| 2,413,687 | 1/1947 | Bogoslowsky | 99/286 X |
| 3,967,546 | 7/1976 | Cailliot | 99/286 |
| 4,703,687 | 11/1987 | Wei | 99/286 |
| 4,724,752 | 2/1988 | Aliesch et al. . | |
| 4,784,050 | 11/1988 | Cavalli et al. . | |
| 4,786,001 | 11/1988 | Ephraim et al. | 241/101.2 |
| 4,858,522 | 8/1989 | Castelli . | |
| 4,970,948 | 11/1990 | Giannelli . | |
| 5,127,318 | 7/1992 | Selby, III . | |
| 5,133,983 | 7/1992 | Greiwe . | |
| 5,174,194 | 12/1992 | Piana . | |
| 5,186,399 | 2/1993 | Knepler et al. . | |
| 5,193,438 | 3/1993 | Courtois . | |
| 5,277,102 | 1/1994 | Martinez et al. . | |
| 5,417,145 | 5/1995 | Joseph, Jr. et al. . | |
| 5,463,934 | 11/1995 | Locati . | |
| 5,479,848 | 1/1996 | Versini . | |
| 5,490,447 | 2/1996 | Giuliano . | |
| 5,568,763 | 10/1996 | Künzler . | |
| 5,650,186 | 7/1997 | Annoni et al. . | |

FOREIGN PATENT DOCUMENTS

| | | |
|---|---|---|
| 0 728 664 A1 | 8/1996 | European Pat. Off. . |
| 2 522 951 | 9/1983 | France . |
| 0 612 758 | 9/1988 | France . |

*Primary Examiner*—Reginald L. Alexander
*Attorney, Agent, or Firm*—Christensen O'Connor Johnson & Kindness PLLC

[57] ABSTRACT

A coffee grinding, portioning, and pressing device (10) includes a coffee bean storage container (20) and coffee grinding mills (24) located under the storage container. Coffee ground by the mills is delivered from the grinding mills (24) into a ground coffee collection chamber (40) and then passes from the collection chamber through a motor-driven pressing tool (50) directly into a detachable delivery filter (14) which is temporarily attached to the device. The shape and rotational motion of the pressing tool cause the ground coffee to be directed through the tool and into the filter container. The pressing tool (50), which is biased downwardly by a spring tensioning mechanism (70) that transmits force to the pressing tool (50) through a tensioning drive axle (74), incrementally and uniformly tamps the coffee into the filter container as the tool rotates. The accumulation of compressed coffee underneath the pressing tool (50) applies upward pressure against the spring tensioning mechanism (70) and causes the pressing tool to rise upwardly as the tool rotates. When the pressing tool (50) has moved upward a predetermined distance, a shut-off switch of a portioning control mechanism (80) is activated, ceasing the further addition of ground coffee. A volume portioning adjustment mechanism (84) modifies the amount of ground coffee that is compacted into the delivery filter.

25 Claims, 5 Drawing Sheets

COFFEE GRINDING, PORTIONING, AND PRESSING DEVICE

FIELD OF THE INVENTION

The present invention relates to a device that automatically grinds, portions, and presses ground coffee beans for use in making coffee drinks. More specifically, this invention relates to a device that grinds whole coffee beans, portions doses of ground coffee by volume, and then uniformly presses the ground coffee into a traditional coffee delivery filter.

BACKGROUND OF THE INVENTION

Producing high quality espresso coffee is the result of the combination of at least five factors which are so closely linked that the total result is endangered if one or more of these factors are lacking or are not of the best quality. These five factors include (1) the mixture of the coffee beans, (2) the grinding of the mixture, (3) the espresso coffee producing machine, (4) the quality of the water used, and (5) the expertise of the operator. The fifth factor in particular, the expertise of the operator, as it relates to the grinding of the whole coffee beans, the portioning of the doses of ground coffee, and the uniformity and repeatability of the ground coffee compaction, represents a large source of unnecessary potential inefficiency and quality degradation that has not been adequately addressed to date.

There are substantial limitations to current coffee grinding machines of the professional bar type that are used for the preparation and delivery of finely ground coffee for use in traditional espresso brewing. These grinding machines do not provide for each portion of coffee to be ground individually and used immediately, nor do they press the ground coffee into the portable delivery filter for the coffee machine. The majority of coffee grinding machines for bar use incorporate a manual, lever-operated, segmented holding chamber for pre-ground coffee. By pulling a lever, the operator dispenses a small quantity of ground coffee into the portable delivery filter. The operator using this system is responsible to judge when the proper amount of ground coffee has been portioned into the portable delivery filter.

Several manufacturers offer machines with a pre-ground coffee chamber for individual portioning of a preselected amount of coffee directly into the delivery filter, eliminating the operator judgment. However, these prior art portioning delivery chambers do not use the accurate and superior measuring method of volume gauging the physical quantity of the ground coffee, but rather implement the inferior measurement techniques of either portioning the coffee by controlling of the whole bean grinding time, or portioning by controlling the amount of whole coffee beans entering the grinding chamber.

There is an additional step to be performed in preparing to use ground and portioned coffee in the espresso brewing method. This step is the pressing of the ground coffee into the portable delivery filter prior to attaching the delivery filter to the espresso machine. To achieve uniformity in the pressure applied to the ground and portioned coffee, the operator performing this task uses a hand-operated pressing tool and applies a downward force to the entire surface of the ground portioned coffee as it is held in the delivery filter. This manual method has the disadvantage of requiring individual judgment as to when the correct amount of pressure has been applied. Further, this manual method of pressing ground coffee into a delivery filter by an individual operator has also been identified as one of the leading causes of repetitive injury syndrome in the coffee business today.

There are manually operated pressing tools that mount directly onto coffee grinders, but they also require operator judgment of how much pressure to apply to the ground coffee. Additionally, there are a few prior art devices that attempt to utilize automatic pressing techniques. However, these prior art devices are flawed, not only in their utilization of unsatisfactory portioning methods, but also through their implementation of inaccurate pressing techniques which do not provide for even and uniform compaction of the ground coffee at a constant rate throughout a portion. There remains a continuing need in the art for a device that grinds whole coffee beans on demand for each individual shot, accurately portions doses of ground coffee by volume quantity, and then uniformly presses the ground coffee at a constant rate throughout the portion into a standard coffee delivery filter.

SUMMARY OF THE INVENTION

The present invention discloses a portioning and pressing device for compacting a preselected quantity of coffee into a delivery filter. The device includes a downwardly biased actuating compaction mechanism that is configured to consistently and incrementally tamp a preselected amount of ground coffee into a delivery filter to produce a substantially uniform ground coffee density throughout the compressed coffee "puck." The actuation of the compaction mechanism processes ground coffee through the mechanism and incrementally tamps the coffee underneath the mechanism into the delivery filter as a result of the configuration of the compaction mechanism and the downward biasing force being applied to the mechanism. A volume quantity dosing calibrator is configured to regulate by volume, the amount of ground coffee that enters the delivery filter by sensing when the compaction mechanism has been raised a preselected distance due to the accumulation of compressed ground coffee underneath the compaction mechanism, and then terminating the actuation of the compaction mechanism, thereby ceasing the flow of ground coffee.

In a preferred embodiment, the present invention finely grinds whole bean coffee using grinding mills to produce a most beneficial and consistent particle grind uniformity. The invention contains an internal fan to cool the grinding mills, thereby preventing heat damage to the coffee being ground. The ground coffee is delivered into a collection chamber where it is passed through a motor driven compaction mechanism into the delivery filter which is temporarily attached to the invention.

The ground coffee is directed through the compaction mechanism and into the delivery filter by rotary motion of the helical, impeller-like shaped compaction mechanism. The compaction mechanism transmits a downward force onto the ground coffee in the filter container from the motor-driven spring tensioning mechanism to which the compaction mechanism is attached. The helical shape of the downwardly biased compaction mechanism incrementally tamps the coffee into the filter container as it passes through the compaction mechanism to produce substantially uniformly tamped coffee. This uniform incremental tamping is performed by the compaction mechanism using a single continuous rotary motion.

The continuing accumulation of compressed ground coffee in the delivery filter underneath the compaction mechanism applies an upward pressure against the spring tension of the motor driven compaction mechanism. As the volume of compacted ground coffee in the delivery filter increases, the rotary motion of the compaction mechanism becomes upward rotary motion as the mechanism is forced upward against the spring resistance to a predetermined shut off switch of a dosing calibrator, thus insuring that a consistent volume of ground coffee has been portioned and pressed into the delivery filter at a constant pressure. The amount of ground coffee that is compacted into the delivery filter can be adjusted by changing the activation position of the predetermined shut off switch at which point the compaction mechanism triggers the dosing calibrator to cease introducing ground coffee.

The coffee grinding, portioning, and pressing device of the present invention eliminates or substantially reduces the current problems described in known coffee grinding machines and manually operated pressing tools.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
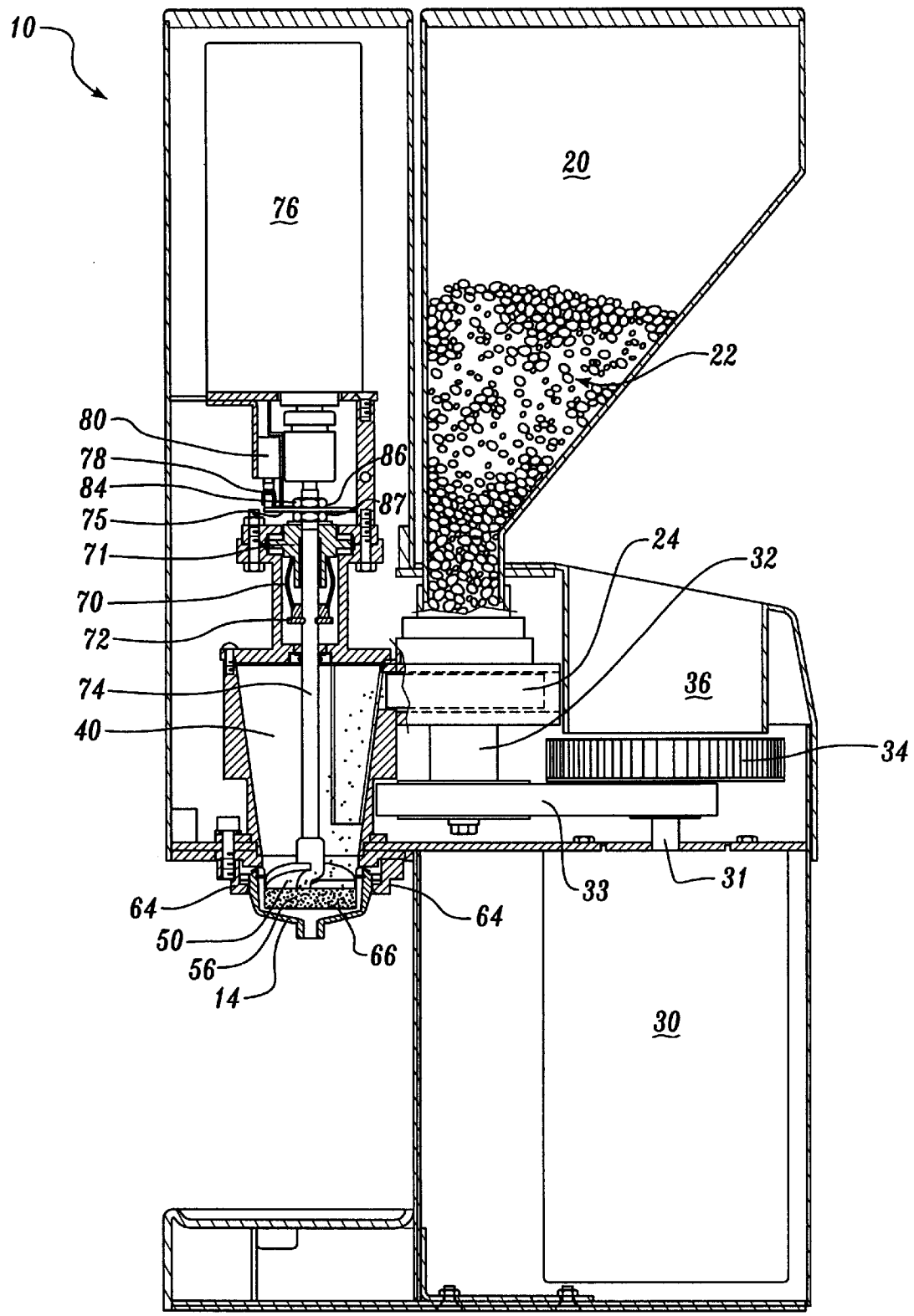
FIG. 1 illustrates a cross-sectional side view of the coffee grinding, portioning, and pressing device of the present invention.

FIG. 1 illustrates a preferred embodiment of a coffee grinding, portioning, and pressing device 10 constructed in accordance with the present invention with a mounted, detachable delivery filter 14. Briefly described, the grinding, portioning, and pressing device 10 includes a whole bean coffee storage container 20 for storage of coffee beans 22. Coffee grinding mills 24 are located under the storage container 20. The coffee beans 22 are ground in the mills and delivered from the grinding mills 24 into a ground coffee collection chamber 40. The ground coffee 38 passes from the collection chamber 40 through a motor-driven, rotating pressing tool 50 directly into the detachable delivery filter 14 which is temporarily attached to the device 10. Specifically, the shape and rotational motion of the pressing tool 50 causes the ground coffee 38 to be directed through the tool 50 and into the delivery filter 14.

The motorized pressing tool 50 is biased downwardly by a spring tensioning mechanism 70 which transmits force to the pressing tool 50 through a tensioning drive axle 74. The pressing tool 50 transmits this downward force onto the ground coffee 38 as the tool 50 rotates and incrementally and uniformly tamps the coffee into the delivery filter 14. The continual accumulation of compressed ground coffee 56 underneath the pressing tool 50 applies upward pressure against the spring tensioning mechanism 70 and causes the pressing tool 50 to rise upwardly as the tool rotates. When the pressing tool 50 has moved upward a predetermined distance, a shut-off switch 78 of a portioning control mechanism 80 is activated, completing the portioning process and ceasing the further introduction of ground coffee 38. The amount of ground coffee 38 that is compacted into the delivery filter 14 can be modified using a volume portioning adjustment mechanism 84 which changes the activation position of the predetermined shut-off switch in the portioning control mechanism 80.

The coffee grinding, portioning, and pressing device 10 will now be described in detail. As shown in FIG. 1, the coffee bean storage container 20 is located in the upper right hand corner of the coffee grinding, portioning, and pressing device 10. The storage container 20 generally acts as a funnel for channeling coffee beans 22 to the coffee grinding mills 24. The size and shape of the storage container 20 can be altered in numerous ways without affecting the functionality of the container 20 or departing from the scope of the present invention. Preferably, however, the storage container 20 can hold a substantial amount of coffee beans 22, so that frequent refilling of the device 10 is not required during extended periods of continuous or near-continuous coffee grinding and brewing production. Further, the storage container 20 is preferably configured so that gravity alone is sufficient to direct the coffee beans 22 to the grinding mills 24.

Figure 2:
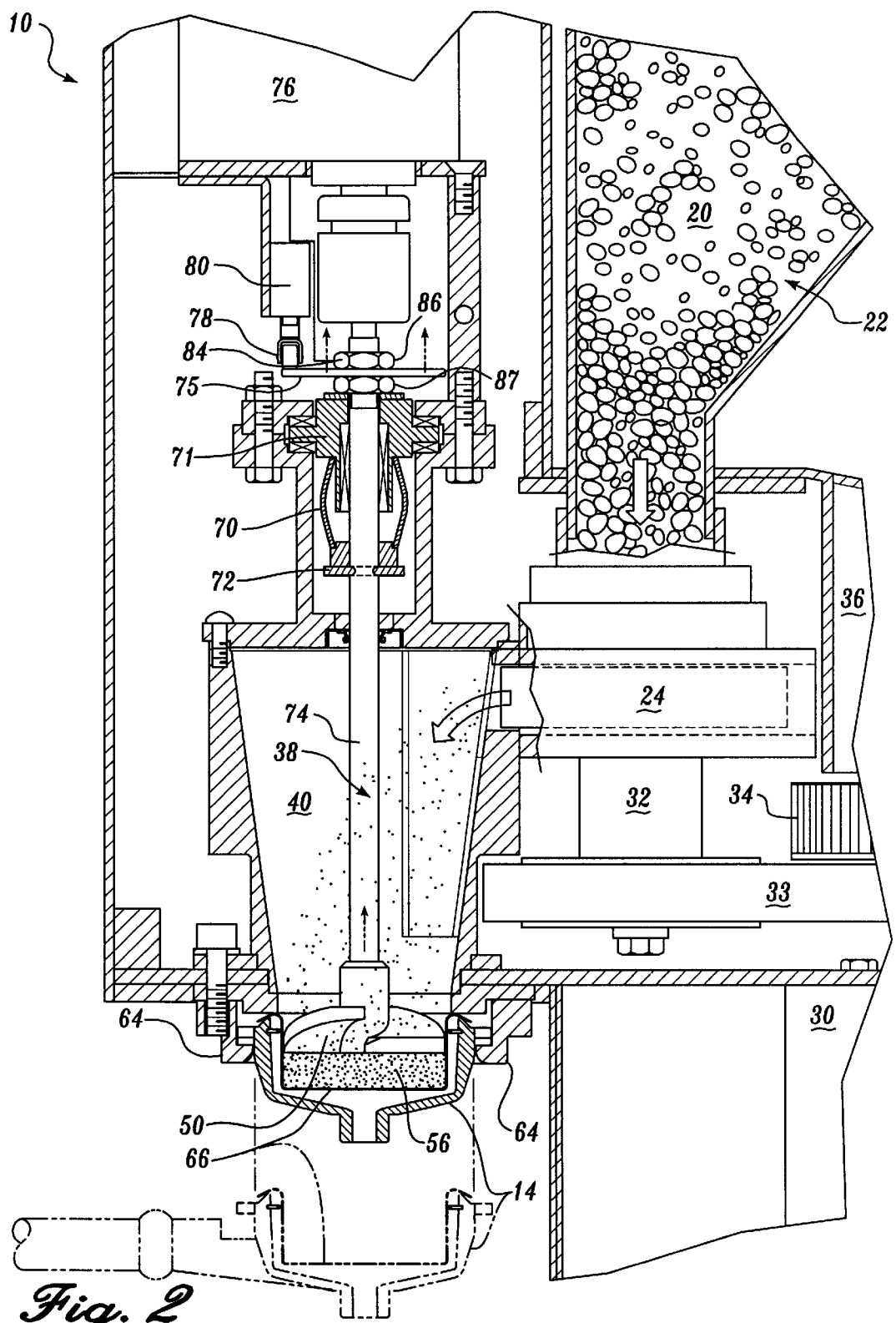
FIG. 2 illustrates a section enlargement of the cross-sectional side view of the invention shown in FIG. 1, demonstrating with broad arrows the path that the coffee follows, demonstrating with narrow phantom arrows the path along which the pressing tool and spring biased pressing assembly are forced by the accumulating compacted ground coffee, and illustrating in phantom lines the detachability of the coffee delivery filter.

As shown in FIG. 2 with broad arrows, coffee beans 22 enter the grinding mills 24 (located in the middle right hand side of FIG. 2) from above, where the coffee is finely ground and then discharged to the left into the ground coffee collection chamber 40. In one embodiment of the present invention all parallel and conical (flat) grinding mills 24 (not shown, but known in the art) are utilized. In another embodiment, the grinding mills 24 employ two sets of grinding mills, one conical and one parallel (also not shown). This combination of conical and parallel sets of mills produces a highly beneficial and consistent particle grind uniformity for optimum release of flavor. Additionally, this combination of conical and parallel grinding mills 24 allows the device 10 to grind at a slow, uniform rate that helps prevent over-heating of the mills which can damage the coffee and harm its flavor. Further, grinding at this slower rate conserves energy and extends the burr life (period of time that the mill blades stay sharp) by a factor of three over traditional parallel mills.

As shown in FIG. 1, the mill drive motor 30 is located in the lower right-hand corner of the coffee grinding, portioning, and pressing device 10. The motor drive shaft 31 extends upward from the top of the mill drive motor 30. A mill shaft 32 extends parallel to the motor drive shaft 31 and downward from the bottom of the grinding mills 24. The motor drive shaft 31 is connected to the mill shaft 32 by a mill drive belt 33, thereby connecting the mill drive motor 30 to the grinding mills 24.

An internal fan 34 is also connected to the motor drive shaft 31, just above the mill drive belt 33. The same motion created by the mill drive motor 30 which powers the grinding mills 24 also powers the rotation of the internal fan 34, since the fan is connected to the motor drive shaft 31. The simultaneous activation of the internal fan 34 in conjunction with the use of the grinding mills 24, acts to cool and prevent overheating of the internal components contained in, and associated with the grinding mills 24. The overheating of these internal components can result in damaging the flavor of the coffee and in the premature failure of the grinding mills 24 and associated components. The internal fan 34 draws in air from an inlet duct 36 located directly above the fan.

As most clearly shown in FIG. 2, after grinding, the ground coffee 38 is delivered into the ground coffee collection chamber 40. The ground coffee collection chamber 40 is frustoconical in shape, and tapers downward to the helical-shaped pressing tool 50 located in a bottom opening. Beneath the pressing tool 50 is a detachable delivery filter 14 which is temporarily attached to the device 10 by delivery filter attachment mounts 64. Lining the inside of the delivery filter 14 is a filter container 66.

Figure 3:
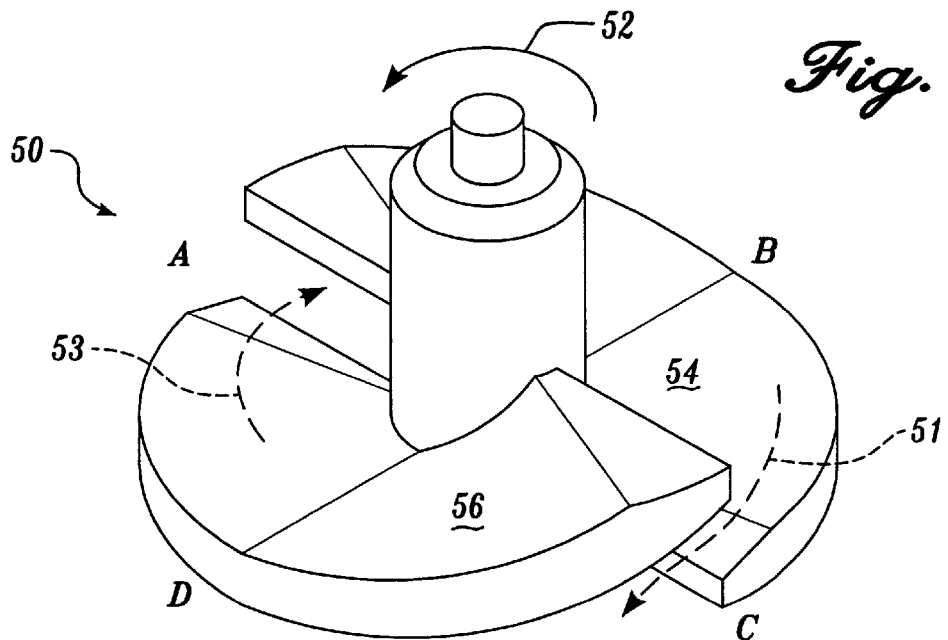
FIG. 3 illustrates a perspective view of the impeller-shaped pressing tool of the present invention, showing with a solid line the rotation of the pressing tool, and showing with dashed lines the path of the ground coffee through the pressing tool as the tool rotates.
Figure 4:
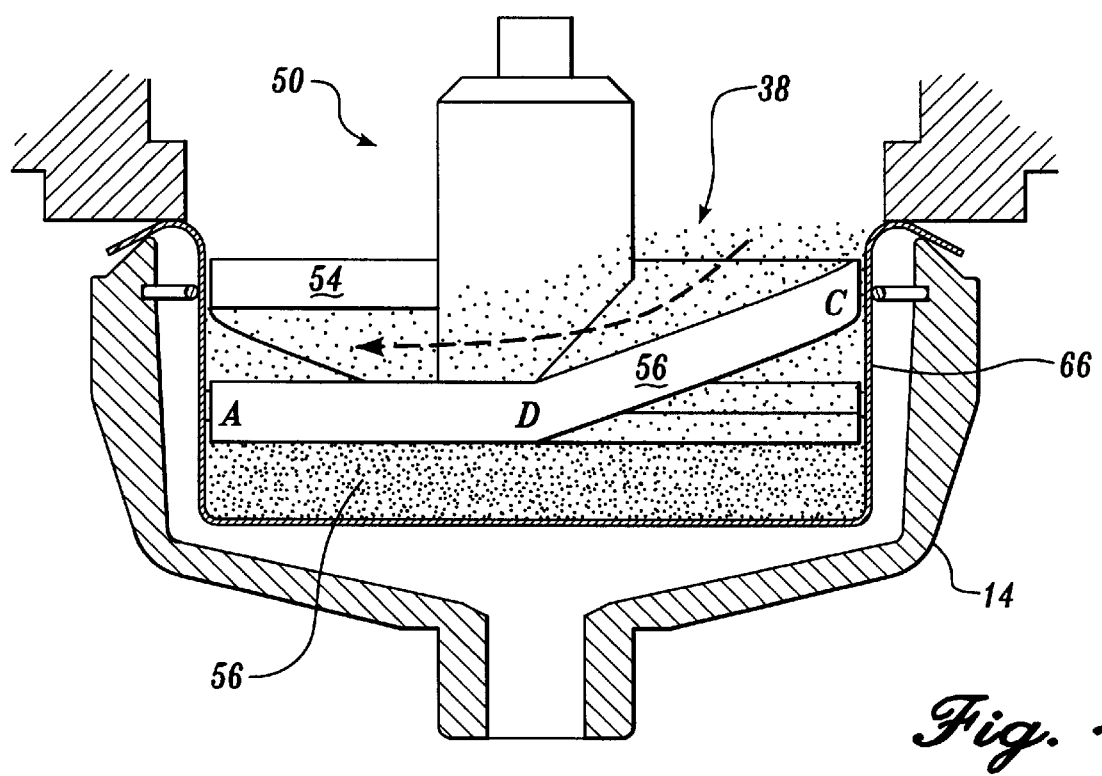
FIG. 4 illustrates a section enlargement of the cross-sectional side view of the invention shown in FIG. 1, demonstrating ground coffee passing through, and being uniformly and incrementally compacted by the pressing tool, with the pressing tool located towards the bottom of the delivery filter.

FIG. 3 illustrates a close-up of the pressing tool 50 in isolation, which resembles an impeller in configuration. The pressing tool 50 undergoes a rotational motion when activated, as shown by the solid arrow 52. When rotated, the helical shape of the pressing tool 50 provides a path for the ground coffee 38 to pass through the pressing tool and into the delivery filter 14 attached below (see FIG. 4). The path followed by the ground coffee 38 during rotation of the pressing tool 50 is shown in FIGS. 3 and 4 by the dashed arrows 51, 53.

The helical-shaped pressing tool 50 includes two ramping fins 54 and 56 (FIG. 3). Referring to the quadrennial numbering in FIG. 3, the first ramping fin 54 begins with its highest point at position A and slopes downward through position B to its lowest point and other end at position C. The second ramping fin 56 then begins with its highest point at position C and slopes downward through position D to its lowest point and other end at position A, where the lower end of the second ramping fin 56 approaches the same polar coordinate position as the upper end of the first ramping fin 54.

Although the impeller-shaped pressing tool 50 of this embodiment contains two ramping fins 54 and 56, alternate embodiments of this invention could incorporate one continuous ramping fin or more than two ramping fins without departing from the scope of the present invention. Other alternate embodiments of the present invention could also incorporate greater or lower ramp fin rising rates than that incorporated in the present embodiment. Further, other alternate embodiments of the present invention could utilize ramping fins that are configured to overlap each other to some degree, in contrast to the embodiment of the present invention shown in FIG. 3, where the first ramping fin 54 ends where the second ramping fin 56 begins, and vice versa. Finally, in yet another alternate embodiment, the helical pressing tool 50 could rotate in the opposite direction and incorporate ramping fins with slopes opposite that of the embodiment shown in FIG. 3.

Figure 5:
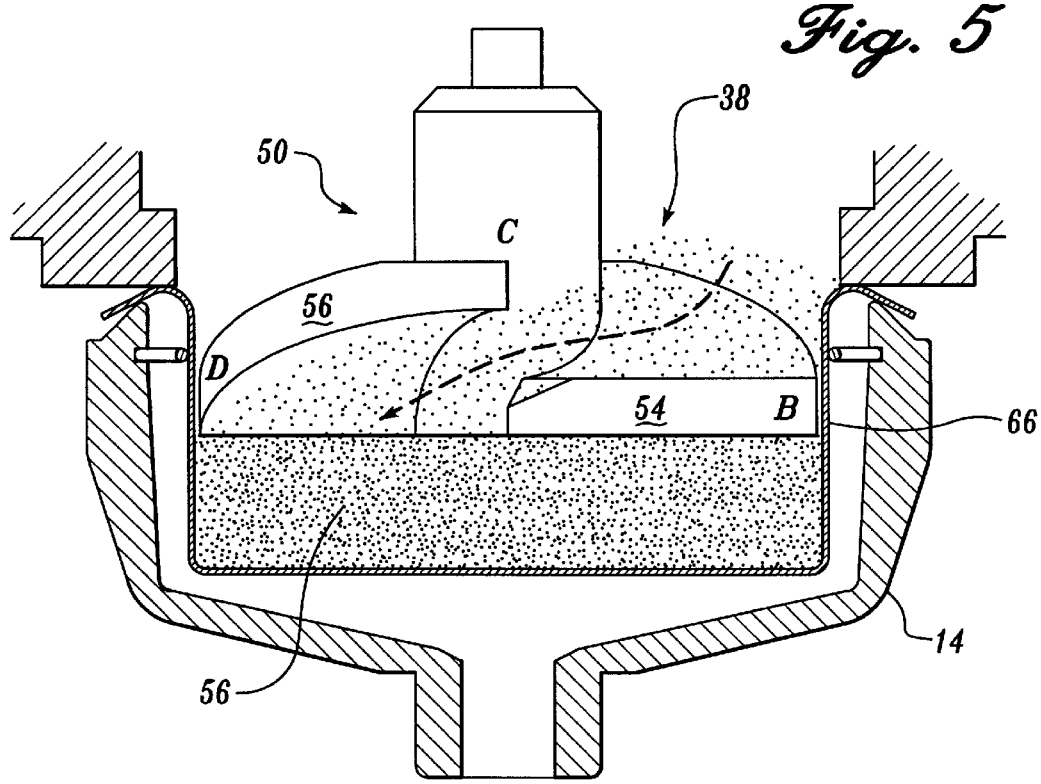
FIG. 5 illustrates a section enlargement of the cross-sectional side view of the invention shown in FIG. 1, demonstrating ground coffee passing through, and being uniformly and incrementally compacted by the pressing tool, with the pressing tool rotated upwards to near the middle of the delivery filter.
Figure 6:
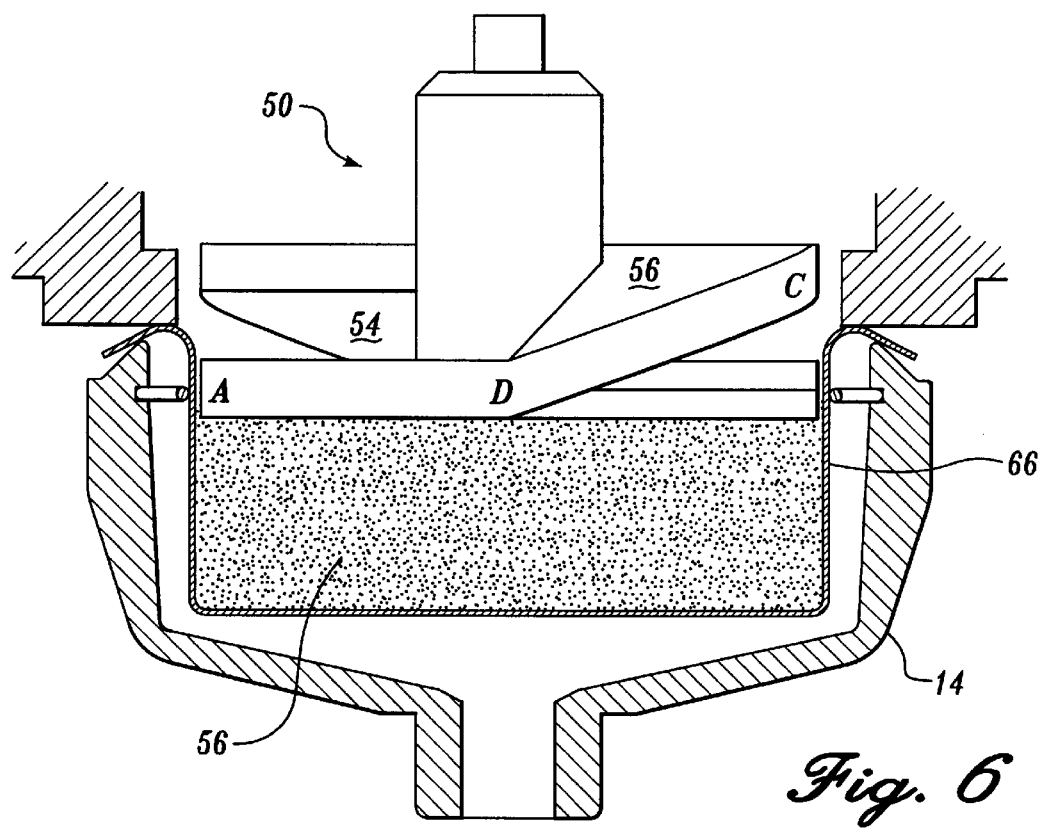
FIG. 6 illustrates a section enlargement of the cross-sectional side view of the invention shown in FIG. 1, demonstrating the completion of the uniform and incremental compaction of the ground coffee by the pressing tool, with the pressing tool fully rotated upwards to the top of the delivery filter.

Referring again to FIG. 1, the pressing tool drive motor 76 is located in the upper left-hand corner of the coffee grinding, portioning, and pressing device 10. The drive motor 76 is connected to the pressing tool 50 by a drive axle 74, and is responsible for powering the rotational motion of the pressing tool 50. The helical configuration and rotational motion of the pressing tool 50 directs the ground coffee 38 from the collection chamber 40 through the pressing tool 50 and into the delivery filter 14, as shown in FIGS. 4–6. A spring tensioning mechanism 70 is connected to the drive axle 74 and transmits a downward force onto the pressing tool 50 through the drive axle 74.

Specifically, the drive axle 74 is slidably received with a rotor 71 that is located above the spring mechanism 70. The upper end of the spring tensioning mechanism 70 attaches to the lower side of the rotor 71, as most clearly shown in FIG. 2. The lower end of the spring tensioning mechanism 70 attaches to a concentric disc 72, that in turn is affixed to the drive axle 74. In this manner, the spring tensioning mechanism 70 biases the drive axle 74, and thus the pressing tool 50 downward, via the attached concentric disc 72, while also allowing the rotation of the drive axle 74 by the drive motor 76 to be compensated for by the rotor 71. Although in the preferred embodiment, a spring is used to provide the tensioning force in the tensioning mechanism 70, any number of known biasing mechanisms could be utilized therein.

An extended disc 75 is also connected to the drive shaft 74 above the rotor 72. The disc 75 provides a substantially flat, circular surface that makes rolling contact with the roller shut-off switch 78 as the extended disc 75 is rotated by the drive motor 76, via the drive shaft 74. The roller shut-off switch 78 activates when the switch has been elevated a predetermined distance (by the extended disc 75).

Figure 7:
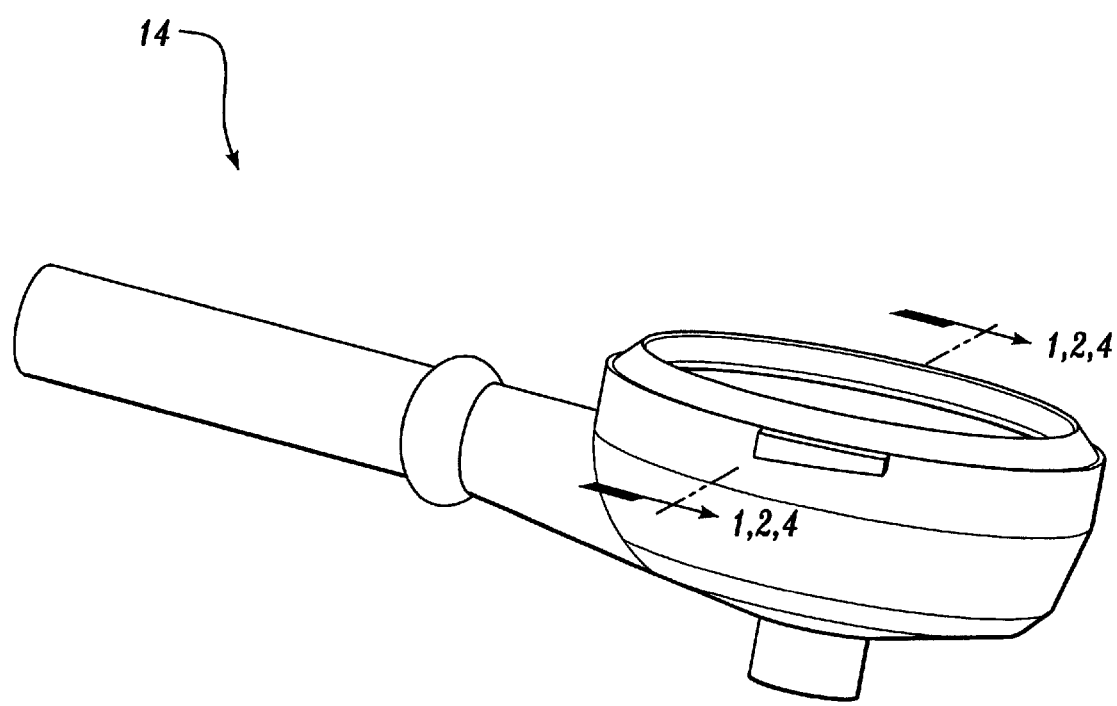
FIG. 7 illustrates a perspective view of the delivery filter that is attachable to the present invention, into which the ground coffee is compacted.

FIG. 7 illustrates a close-up perspective view of the delivery filter 14 in isolation, detached from the coffee grinding, portioning, and pressing device 10. The delivery filter 14 is temporary attached to the device 10 by placing the filter over the depending pressing tool 50 and into matable contact with the attachment mount 64, as shown in FIG. 2. The delivery filter 14 is then rotated 90 degrees (out of FIG. 2), locking the filter 14 into secured engagement with the attachment mount 64. The filter 14 is then removed after being filled with a portioned and compacted amount of ground coffee 56, by rotating the filter 90 degrees in the opposite direction.

To produce ground, portioned, and compacted coffee using this device 10, the operator places coffee beans 22 in the storage container 20, attaches a portable delivery filter 14 to the attachment mount 64, and turns on the machine 10. Turning on the machine 10 activates the grinding mills 24 and the rotating pressing tool 50. The mills 24 grind the whole beans 22 into ground coffee 38, which is directed into the collection chamber 40, the pressing tool 50 at the bottom the chamber 40 and into the delivery filter 14. Referring now to FIG. 4, the pressing tool 50 transmits downward force from the spring tensioning mechanism 70 onto the ground coffee 3 8 in the delivery filter 14 as ground coffee 38 passes underneath the rotating pressing tool 50. The combination of the helical configuration of the pressing tool 50, the rotational motion of the pressing tool 50, and the downward force being applied onto the ground coffee 38 by the pressing tool 50, synergistically act together to incrementally and substantially uniformly tamp the ground coffee 38 into the collection filter 66 within the delivery filter 14.

This uniform incremental tamping is produced by the helical pressing tool 50 using a single continuous rotational motion and substantially constant downward force. In this manner, incremental tamping of the coffee is performed as the collection filter 66 is filled from the bottom to the top, producing a compacted coffee "puck" 56 of substantially uniform density. The continual incremental compaction produced by the helical pressing tool 50 avoids the density gradient variations typically found in coffee pucks produced using traditional tamping techniques, which detract from optimal coffee flavor creation. Additionally, the density of the compacted coffee 56 produced by this device can be modified by altering the strength of the spring or other biasing device utilized in the tensioning mechanism 70.

As most readily understood by viewing FIGS. 4, 5, and 6 sequentially, the continual accumulation of compressed ground coffee 56 underneath the helical pressing tool 50 applies an increasing upward pressure against the tensioning mechanism 70 via the pressing tool 50, that causes the pressing tool and axle 74 to rise upwardly in response to this increasing pressure (which overpowers the force of the spring tensioning device 70, causing it to bow outward) as the pressing tool rotates. The counterbalancing of the upward force produced by the compacted coffee 56 against the downward force transmitted through the pressing tool 50 from the spring tensioning mechanism 70, produces a uniform pressure continual tamping as the pressing tool 50 is incrementally raised upwards through its rotational motion by the accumulating coffee underneath.

When the collection filter 66 has been filled with the preselected amount of compacted coffee 56, and thus, has raised the pressing tool 50 a preselected distance (as shown in FIG. 6), an extending disc 75 located on the drive axle 74 activates the roller shut-off switch 78 of the portioning control mechanism 80. The portioning control mechanism 80 then ceases the rotation of the pressing tool 50, which in turn terminates the further addition of any ground coffee 38 into the collection filter 66. Activation of the portioning control mechanism 80 also shuts off the grinding mills 24. Thus, the collection chamber 40 never actually fills with ground coffee 38 to any significant degree, but rather acts only as a funnel, directing the ground coffee 38 to the pressing tool 50 and the delivery filter 14. This simultaneous grinding and compaction shut-off design results in only enough whole beans 22 being ground that are needed for each compacted coffee puck 56, thus achieving optimum freshness while minimizing wasted ground coffee 38.

The roller shut-off switch 78 need not be configured to be activated by an extending disc 75 on the drive axle 74, but rather could be designed to be activated by any number of different mechanical configurations that would trigger the portioning control mechanism 80 when the pressing tool 50 had been raised a preselected distance. Having the portioning control mechanism 80 designed to designate completion of the coffee portioning and tamping when the pressing tool 50 has been forced upward a preselected distance (against the spring tensioning mechanism 70 by the accumulating compacted coffee 56 underneath the pressing tool 50), ensures that a consistent volume of ground coffee 38 has been portioned and compressed under a consistent pressure into the delivery filter 14.

Referring again to FIG. 2, the coffee grinding, portioning, and pressing device 10 further includes a volume portioning adjustment mechanism 84 which changes the activation position of the predetermined shut-off switch 78 on the portioning control mechanism 80, and thus can be used to vary the amount of ground coffee 38 that is compacted into the delivery filter 14. The volume portioning adjustment mechanism 84 utilizes a pair of nuts 86, 87 on opposite sides of the disk 75. The nuts 86, 87 are threaded onto the drive axle 74, and can be used to adjust the position of the disk 75 up or down. In this manner, the volume of ground coffee that is compacted into the delivery filter 14 can be varied.

The process of grinding, dosing, and tamping coffee 56 into each delivery filter 14 takes only approximately five to ten seconds to perform. The delivery filter 14 can then be detached from its attachment mount 64 on the device 10 and attached to the espresso coffee machine where it is infused with pressurized hot water to produce espresso shots. With this device 10, grind adjustments can be made immediately, with no dose hopper residual grounds to throw out after trial adjustments are made. Further, this device 10 grinds by volume, which is the most accurate way to measure coffee for espresso brewing, not by time. Additionally, this device 10 grinds per individual shot, which reduces waste due to operator shift changes or end of the day mark outs, since no extra ground coffee 38 is produced that remains in the collection chamber 40. Simply put, this device produces ground, portioned, and tamped coffee 56 of constant volume and constant pressure, with a high degree of repeatability. This device 10 greatly simplifies the grinding, portioning, and pressing process, and through its high-quality automation reduces the unnecessary reliance on highly skilled and trained operators to produce quality coffee drinks.

The present invention has been described in relation to a preferred apparatus embodiment, several alternate preferred apparatus embodiments, and a preferred method embodiment. One of ordinary skill, after reading the foregoing specification, may be able to effect various other changes, alterations, and substitutions or equivalents thereof without departing from the concepts disclosed. It is therefore intended that the scope of the Letters Patent granted hereon be limited only by the definitions contained in the appended claims and equivalents thereof The embodiments of the invention in which an exclusive property or privilege is claimed are defined as follows:

1. A portioning and pressing device for compacting a preselected quantity of coffee, the device comprising:

a pre-compaction chamber for delivering ground coffee into a container;

a compaction mechanism located above the container and configured to consistently and incrementally tamp a preselected amount of ground coffee into the container as the coffee is delivered, thereby producing substantially uniform ground coffee density therethrough, wherein actuation of said compaction mechanism processes ground coffee through the compaction mechanism and incrementally tamps the ground coffee underneath the compaction mechanism into the container as a result of the downward biasing of the compaction mechanism; and a volume quantity dosing calibrator configured to shut off the compaction mechanism when the container has been filled a predetermined amount, by sensing when the compaction mechanism has been raised a preselected distance due to the accumulation of compressed ground coffee underneath the compaction mechanism, and then terminating the actuation of the compaction mechanism, thereby ceasing the flow of coffee.

2. The device of claim 1, further comprising a feeding mechanism for delivering ground coffee into the pre-compaction chamber.

3. The device of claim 2, wherein the volume quantity dosing calibrator is further configured to shut off the feeding mechanism when the container has been filled a predetermined amount.

4. The device of claim 2, wherein the feeding mechanism comprises a coffee grinding mechanism having grinding mills.

5. The device of claim 4, further comprising a whole bean coffee storage chamber for delivering whole coffee beans into the coffee grinding mechanism.

6. The device of claim 4, further comprising an internal fan configured to cool the grinding mills, and thereby prevent heat damage to the coffee being ground.

7. The device of claim 1, wherein the incremental tamping is performed by the actuating compaction mechanism using a single continuous motion.

8. The device of claim 1, wherein the actuation of the compaction mechanism comprises rotary motion.

9. The device of claim 8, wherein the rotary motion of the compaction mechanism further comprises upward rotational motion due to the continuing accumulation of compressed ground coffee in the delivery system underneath the compaction mechanism.

10. The device of claim 1, wherein the compaction mechanism is helical in shape.

11. The device of claim 1, wherein the compaction mechanism is downwardly biased by a load inducing member.

12. The device of claim 1, wherein the load inducing member comprises at least one spring tensioning member.

13. The device of claim 1, wherein the volume quantity dosing calibrator contains a volume dosing adjustment that is configured to allow the amount of ground coffee that is compacted into the delivery system to be adjusted by selecting the elevation level at which the actuating compaction mechanism triggers the dosing calibrator to cease introducing ground coffee into the delivery system.

14. The device of claim 1, further comprising a container attachment mount and wherein the container is attachable to the device.

15. A portioning and pressing device for compacting a preselected quantity of coffee into a filter container attached to the device, the device comprising:
    a biasing mechanism;
    a ground coffee directing chamber;
    a rotating pressing tool operatively associated with the biasing mechanism, said tool configured to allow ground coffee to pass from the collection chamber through the tool and be substantially uniformly and incrementally compressed underneath the tool into the filter container attached to the device by the rotation of the pressing tool, said tool transmitting a preselected downward force against the ground coffee underneath the tool from the biasing mechanism, said pressing tool being forced upward against the biasing mechanism during rotation by the accumulation of compressed coffee underneath the tool; and
    a ground coffee volume quantity portioning mechanism configured to cease further introduction of ground coffee into the filter container attached to the device after the pressing tool has been raised a preselected distance by the accumulation of compressed coffee underneath the tool, thereby shutting off the device after a preselected amount of ground coffee has passed through and been compressed by the pressing tool into the filter container.

16. The device of claim 15, further comprising a feeding mechanism for delivering ground coffee into the ground coffee directing chamber.

17. The device of claim 16, wherein the feeding mechanism comprises a coffee grinding mechanism having grinding mills.

18. The device of claim 17, further comprising a whole bean storage coffee chamber for delivering whole coffee beans into the coffee grinding mechanism.

19. The device of claim 17, further comprising an internal fan configured to cool the grinding mills, and thereby prevent heat damage to the coffee being ground.

20. The device of claim 15, wherein the pressing tool is helical in shape.

21. The device of claim 15, wherein the biasing mechanism comprises at least one spring tensioning member.

22. The device of claim 15, wherein the volume quantity portioning mechanism contains a volume portioning adjustment that is configured to allow the amount of ground coffee that is compressed into the filter container to be adjusted by setting the elevation level at which the upwardly rotating pressing tool triggers the portioning mechanism to cease introducing ground coffee into the filter container.

23. The device of claim 15, further comprising a filter container attachment mount and wherein the container is attachable to the device.

24. A portioning and pressing device for compacting a preselected quantity of coffee, the device comprising:
    a pre-compaction chamber for delivering ground coffee into a container;
    a compaction mechanism located above the container and configured to consistently and incrementally tamp a preselected amount of ground coffee into the container as the coffee is delivered, thereby producing substantially uniform ground coffee density therethrough; and
    a volume quantity dosing calibrator configured to shut off the compaction mechanism when the container has been filled a predetermined amount.

25. A portioning and pressing device for compacting a preselected quantity of coffee, the device comprising:
    means for grinding whole coffee beans;
    means for directing ground coffee beans into a collection chamber;
    means for biasing a rotating compaction mechanism downward;
    means for actuating the compaction mechanism to rotate and direct ground coffee from the collection chamber through the compaction mechanism and incrementally tamp the ground coffee underneath the compaction mechanism into a container as a result of the downward biasing, wherein the compaction mechanism is continually forced upward against the downward biasing during the compaction mechanism's rotation by the accumulation of compressed coffee underneath the mechanism;
    means for regulating the volume quantity of ground coffee that is tamped into the container by sensing when the upwardly rotating compaction mechanism has reached a predetermined level; and
    means for terminating the actuation of the rotating compaction mechanism, thereby terminating the flow of ground coffee into the container.

* * * * *